United States Patent [19]

Lorence et al.

[11] Patent Number: 4,492,372
[45] Date of Patent: Jan. 8, 1985

[54] AMUSEMENT HELICOPTER

[75] Inventors: Allan L. Lorence, Oelwein; Thomas L. Maring, Cedar Rapids, both of Iowa; James L. Rawson, deceased, late of Oelwein, Iowa, by Oelwein State Bank, administrator

[73] Assignee: Rawson Control Systems, Inc., Oelwein, Iowa

[21] Appl. No.: 348,032

[22] Filed: Feb. 11, 1982

[51] Int. Cl.³ .............................................. A63G 31/00
[52] U.S. Cl. ......................................... 272/1 C; 272/17
[58] Field of Search ....................... 434/33, 55, 56, 57, 434/58; 272/17, 18, 1 C, 6

[56] References Cited

U.S. PATENT DOCUMENTS

| | | | |
|---|---|---|---|
| 1,789,680 | 1/1931 | Gwinnett | 272/18 |
| 2,094,397 | 9/1937 | Cortes | 434/55 |
| 2,930,144 | 3/1960 | Fogarty | 434/58 |
| 3,281,962 | 11/1966 | Pancoe | 434/58 |
| 3,577,655 | 5/1971 | Pancoe | 434/58 |
| 3,619,911 | 11/1971 | Pancoe . | |
| 3,818,154 | 6/1974 | Presentey | 200/6 A |
| 3,818,613 | 6/1974 | Julian et al. | 434/33 |
| 3,967,387 | 7/1976 | Marchegiani | 434/58 |
| 4,019,261 | 5/1977 | Pancoe . | |
| 4,382,166 | 5/1983 | Kim | 273/313 |

Primary Examiner—Mickey Yu
Attorney, Agent, or Firm—Hugh D. Jaeger

[57] ABSTRACT

Helicopter intended for use as a toy and raisable on a four-bar linkage by a hydraulic cylinder through a hydraulic circuit. An electrical circuit provides for alternately flashing flight lights, pulsating front gun lights, and for providing through a speaker a chopper sound and a phasor gun sound. The hydraulic circuit includes a novel single spool for regulating flow through a valve between a combined motor pump tank to a cylinder at a fast speed up and slow speed down. The valve is mechanically linked to the joy stick. The four-bar linkage includes a safety bar which overrides the joy stick in the event that an individual or an object is positioned under the linkage in an elevated condition. The hydraulic circuit is provided with a joy stick stop limit within the joy stick throttle structure, a valve control stop link, a safety bar limit, and the inherent four-bar linkage limit, all of these limits acting to keep oil in the cylinder and provide for safety of operation. All of the electromechanical circuitry is positioned in one box which mounts within the enclosure providing for accessible and ease of replacement servicing as required.

8 Claims, 8 Drawing Figures

AMUSEMENT HELICOPTER

BACKGROUND OF THE INVENTION

1. Field of the Invention

The present invention pertains to a toy and flight simulator and, more particularly, pertains to a hydraulically and electromechanically operated aircraft, in this particular instance a rotary-wing helicopter.

2. Description of the Prior Art

The prior art helicopters and airplanes usually labeled as "toys" or "amusement devices" have lacked in reliability and safety. The prior art devices have had an unusual number of electromechanical as well as hydraulic parts requiring large hydraulic reservoirs and circuits along with numerous hydraulic components, leading to a reliability problem and frequent breakdown. The prior art devices have usually utilized a plurality of control valves in hydraulic circuits requiring large amounts of hydraulic fluid and valving. This has led to reliability problems as well as excessive uses of energy in powering the amusement devices. Another particularly important problem in recent years has been safety of the devices and overrides not only for the individual in or on the ride but for those in close proximity, and has always been a problem with individuals possibly crawling under the toys as they are in an elevated position and then with the device coming down and tending to compress or crush the individual or his bodily components thereof.

The present invention overcomes the disadvantages of the prior art by providing a new and novel spool valve in a hydraulic circuit and a safety bar as well as stop limits inherently fabricated into a four-bar linkage, providing for least amount of use of hydraulic energy as well as maximum safety, not only to the individual in the amusement device but also to those in the surrounding area.

SUMMARY OF THE INVENTION

The general purpose of the present invention is to provide an amusement device for trainer simulator of an aircraft operated by at least one hydraulic cylinder between a rest position and an elevated position to simulate flight, with audible flight engine sounds and firing control sounds, and including safety structure for the individual operating the aircraft as well as those in the immediate surrounding vicinity. The aircraft is hydraulically raised through a four-bar linkage and includes electromechanical circuitry for alternately flashing flight lights and gun lights, along with providing audio sounds of flight as well as firing of weapon systems.

According to one embodiment of the present invention, there is provided an aircraft simulator and amusement device including a metal rectangular frame supporting a hydraulic circuit including motor, pump, and tank, four-way selector valve having a configured spool and connected to a hydraulic cylinder, a four-bar linkage connected between the frame and joy stick pad, a hydraulic cylinder connected between the frame and a mid-portion of the four-bar linkage, a linkage connected between the joy stick and the spool of the valve, a safety bar connected between the joy stick pad, the joy stick linkage, and the frame, the joy stick pad including fixed limits within which to reciprocate, the safety bar including slotted fixed limits for movement of the joy stick linkage, and the valve including a stop pin limit, the four-bar linkage including an inherent movement of limit, the electromechanical circuit including circuitry for timing the motor operation and including circuits for providing aircraft sounds as well as firing control noise of the weaponry in addition to alternately switching of the aircraft lights and additional switching of simuated firing of the weaponry lights, and supporting a cover about the hydraulic circuitry as well as moveable triangular portions to prevent insertion of any body members within the linkage whereby the aircraft simulates elevated flight during movement of the cockpit through an up-and-down position actuated by the hydraulic cylinder through the four-bar linkage and providing inherent safety stops as well as a safety bar in the event that the aircraft comes down on an object, thereby providing for safe simulated flight of an aircraft.

One significant aspect and feature of the present invention is a hydraulically powered four-bar linkage using a unique and novel selector valve requiring least hydraulic energy for lifting a structure such as a toy, whether the toy be an aircraft including a rotary-wing helicopter, fixed-wing airplane, space shuttle, space ship or the like, and including inherent safety and stop limits for safe operation, not only for the operator's safety but for nearby individuals and objects thereabout. The aircraft includes a vertically raisable structure, flashing aircraft lights, flashing gun lights and sound effects for airplane noise as well as firing control weaponry noise. The speaker for the noise generator is conveniently mounted behind the seat in the cockpit of the aircraft, providing for ample noise for the individual but not polluting the surrounding environment with noise.

Another significant aspect and feature of the present invention is a hydraulic circuit which uses a least amount of energy and is efficient in operation. The circuit includes a spool selector valve for ample raising as well as lowering of the structure about the joy stick or yoke of the aircraft, and provides for return to a rest position in the event of loss of hydraulic power.

A further significant aspect and feature of the present invention is a hydraulic actuated aircraft which simulates real flight conditions to an individual and is reliable in operation as a hydraulically operated simulator/toy as well as providing safety of operation to the individual and surrounding environment.

Additional significant aspects and features of the present invention include a safety bar which overrides the throttle limit of the joy stick and further keeps the oil in the hydraulic cylinder. Also, the throttle is provided with a limit, the valve control link with a valve pin limit, an inherent four-bar linkage limit, and the safety stop bar limit. All the electronics are enclosed within one electrical box, providing for one box replacement in the event of servicing, the electrical box being positioned under fiberglass housing structure of the framed base.

Having described one embodiment of the present invention, it is the principal object hereof to provide a hydraulically actuated aircraft, the aircraft including a helicopter, airplane, space shuttle, space ship, etc.

An object of the present invention is to provide a hydraulically actuated aircraft, the aircraft used for purposes of amusement as well as instruction.

Another object of the present invention is to provide a hydraulic circuit for an aircraft where the hydraulic circuit is reliable and efficient in operation.

A further object of the present invention is to provide an aircraft which is functionally safe in operating characteristics to the individual and the surrounding environment.

An additional object of the present invention is to provide an aircraft with an electrical circuit which simulates sounds of flight as well as sounds of firing weaponry.

BRIEF DESCRIPTION OF THE DRAWINGS

Other objects and many of the attendant advantages of this invention will be readily appreciated as the same becomes better understood by reference to the following detailed description when considered in connection with the accompanying drawings, in which like reference numerals designate like parts throughout the figures thereof and wherein.

DESCRIPTION OF EMBODIMENTS

Figure 1:
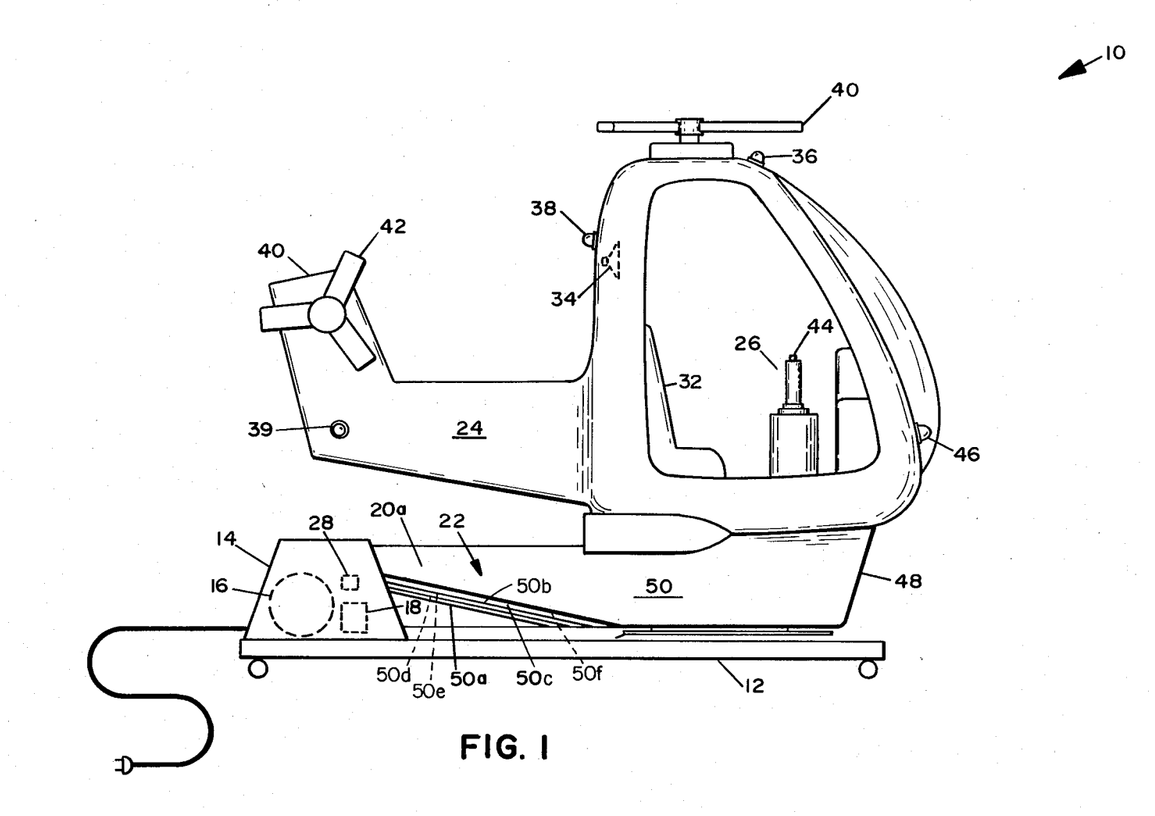
FIG. 1 illustrates a front view of a helicopter aircraft, the present invention.

FIG. 1 illustrates a helicopter 10, the present invention, positioned on a main frame 12 covered with fiberglass housing 14. The fiberglass housing 14 covers the hydraulic motor assembly 16, the electrical circuit components 18, and a portion of sideplates 20a and 20b, also illustrated in FIG. 2, which are welded to the main frame 12 and support the lower end of a four-bar linkage 22 of FIG. 2 with a helicopter body 24 positioned on the upper end of the fourbar linkage. A joy stick 26 connects through the fourbar linkage to a hydraulic valve 28 of FIG. 2 for actuating a hydraulic cylinder 30 providing for vertical lift of the helicopter body 24. A seat 32 accommodates a small individual within the body. A speaker 34 is located behind the seat providing for electronically generated chopper sounds and firing weapon sounds within the body of the helicopter but yet not invading the outside environment with environmental noise. A plurality of top flight lights 36 position on the top of the helicopter body 24 while side-flight lights 38 position on the rear of the helicopter body 24 which are alternately flashed for visual effects. A rotor 40 and tail rotor 42 are rotatably mounted on the respective portion of the body for simulated effect and can be connected to a motor for rotation during simulated flight. A weaponry firing switch 44 is positioned in the joy stick 26 and a plurality of alternating lights 46 positioned on the front of the helicopter body 24 for simulating weaponry firing. A suitable cloth shield 48 covers the fourbar linkage and triangular members 50a–50g are pivoted to protect either side of the four-bar linkage. Lights 36 and 38 alternately flash with light 39 on the tail.

Figure 2:
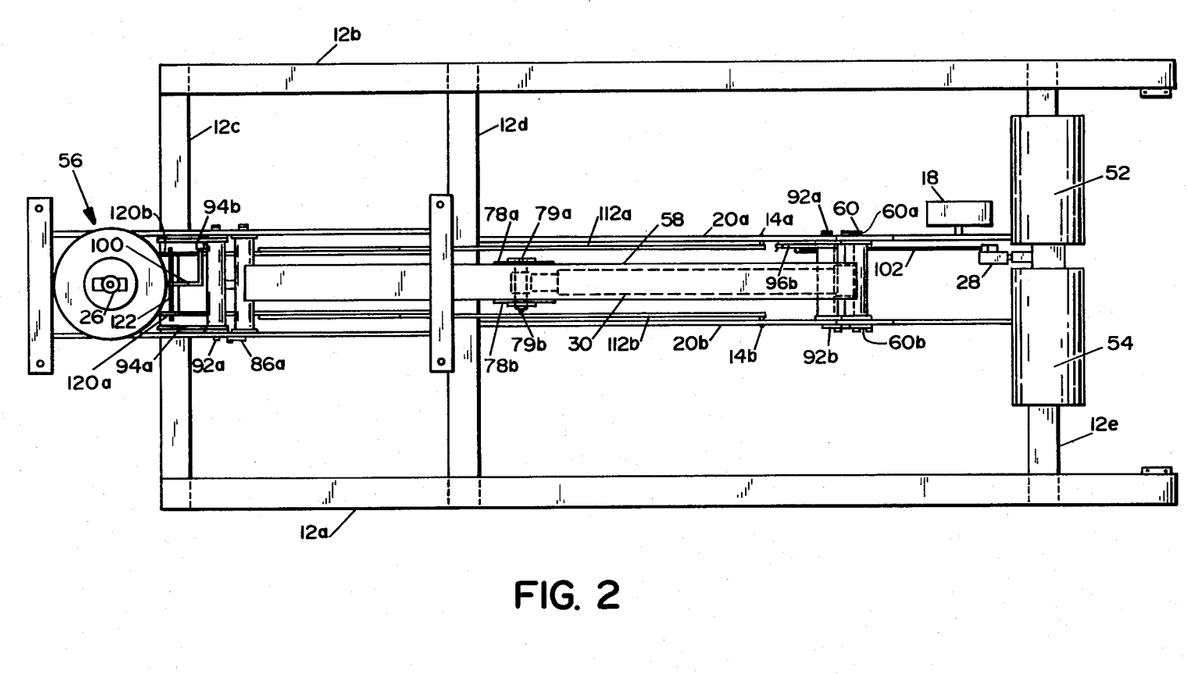
FIG. 2 illustrates a top view of the support structure with the aircraft body removed.

FIG. 2 illustrates a top plan view of a helicopter 10 with a helicopter body 24 and the fiberglass housing 14 removed. The frame is constructed out of square steel tubing with members 12a–12e appropriately welded together to form the interlaced rectangular frame. Sideplates 20a and 20b are welded between support members. The hydraulic assembly 16 includes a motor 52, a pump and tank 54, the valve 28 connected through a linkage to the joy stick 26, and the cylinder 30. The joy stick positions on a pad assembly 56 which pivots about a lift arm assembly 58. A pin weldment 60 supports the lift arm between plates 20a and 20b and is secured thereto with a snap ring 60a and a lock pin 60b which is subsequently bolted to plate 20b.

Figure 3:
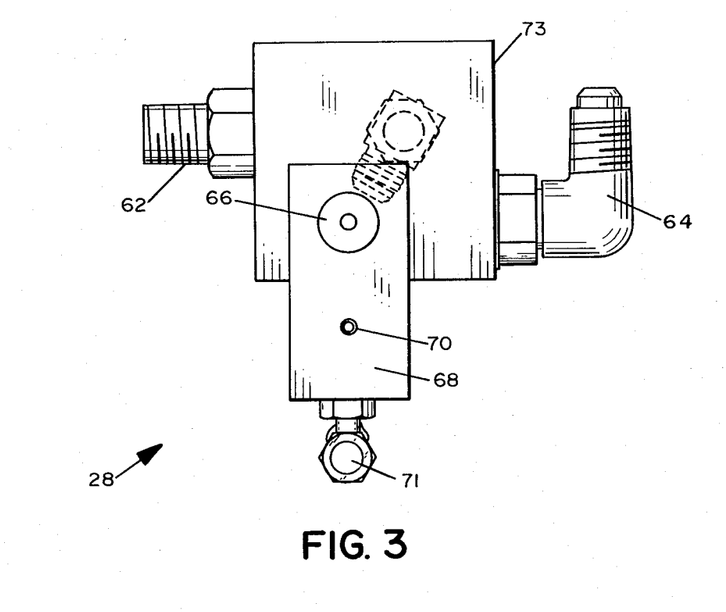
FIG. 3 illustrates a plan view of a hydraulic valve for a hydraulic circuit of the aircraft.

FIG. 3 illustrates a plan view of the hydraulic valve 28 including an inlet port 62, outlet port 64, a rotatable spool 66, a link 68 secured to the spool 66, pin stop 70, and an eye 71 in a housing 73.

Figure 4:
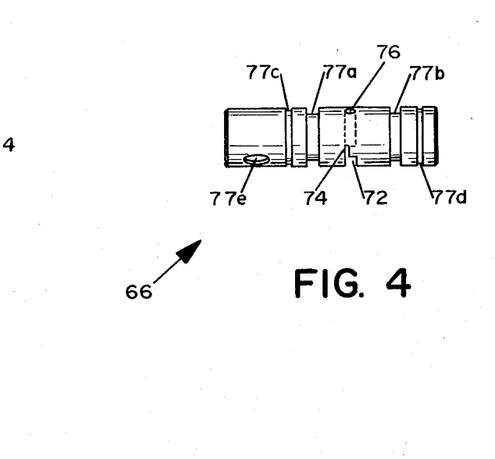
FIG. 4 illustrates a cross-sectional view of a spool of the hydraulic valve of FIG. 3.

FIG. 4 illustrates a cross-sectional view of the spool 66 showing a wide orifice 72 and a narrow orifice 74. The small narrow 74 orifice provides for upward lift of the helicopter while the wide orifice provides for a fast downward movement of the helicopter. Hole 76, O-ring grooves 77a and 77b, snap ring grooves 77c and 77d and a link pin to mounting hole 77e are also illustrated. Hole 76 is a pressure balancing hole providing for equalized pressure of the hydraulic fluid about the spool.

Figure 5:
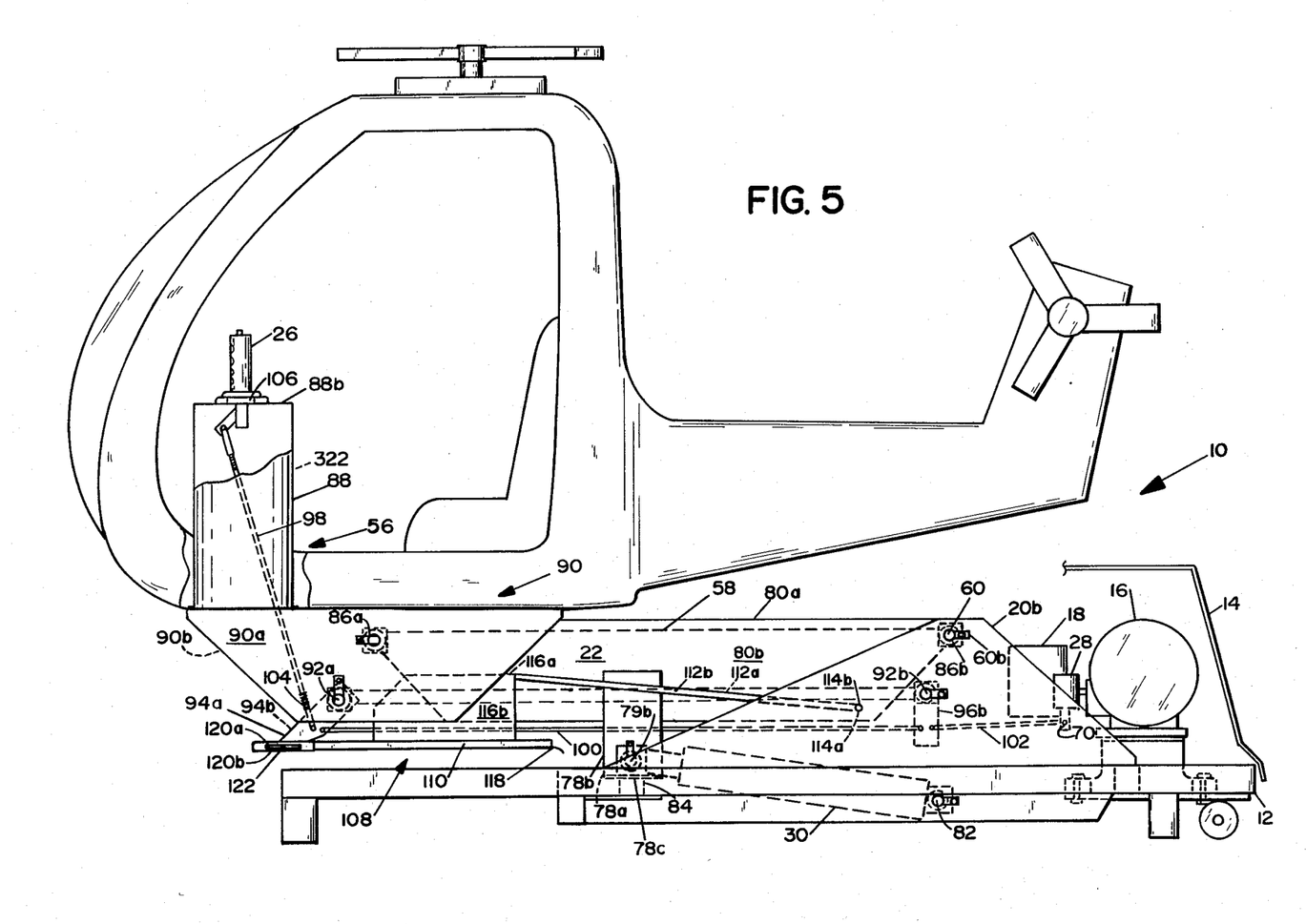
FIG. 5 illustrates a side view of the structure for raising the aircraft in a rest position.

FIG. 5 illustrates a side view of the structure of the helicopter 10 in a rest position. Opposing ears 78a and 78b weld onto both sides of lift arm 80a and 80b for axially supporting one end of the hydraulic cylinder 30. The other end of the hydraulic cylinder 30 pivotally secures to the frame at point 82. A rubber bumper padding 84 secures to the frame and provides for cushioning of the end of the hydraulic cylinder including the raisable four-bar linkage assembly affixed to the lift arm assembly 58. The lift arm assembly 58 is patterned out of beam channel with appropriate pivot tubes 86a and 86b welded at each end. A flat plate 78c welds to the bottom of the ears 78a and 78b providing for a rest member against the rubber bumper pad 84.

The pad assembly 56 includes a pedestal tube 88 having a disc covering 88b, the pedestal tube 88 which welds to the base of a configured channeled bar 90 which engages over the pivot tube 86a and is pinned thereto for movement about the pivot tube 86a. The sides 90a and 90b engage over the sides 80a and 80b respectively. The joy stick 26 positions on the disc 88b. Two additional pivot points 92a and 92b include two barbell cranks 94a and 94b at pivot point 92a and barbell crank 96b at pivot point 92b. Pivot points 92a, 92b, 86a and 86b provide the pivot points for the fourbar linkage. A linkage 98 connects from the joy stick 26 to the barbell 94b, a linkage 100 connects from the barbell 94b to 96b, and a linkage 102 connects from the barbell 96b to the pin 70 of the valve 28. Threaded adjustments are provided at 104 for adjusting the joy stick. An elongated hole 106 is provided in the disc 88b for stop limit movements of the joy stick 26. A safety bar assembly 108 includes a safety panel 110, linkage bars 112a and 112b which pivot at points 114a and 114b, side covers 116a and 116b, bar 118, slotted keys 120a and 120b and pin 122.

Figure 6:
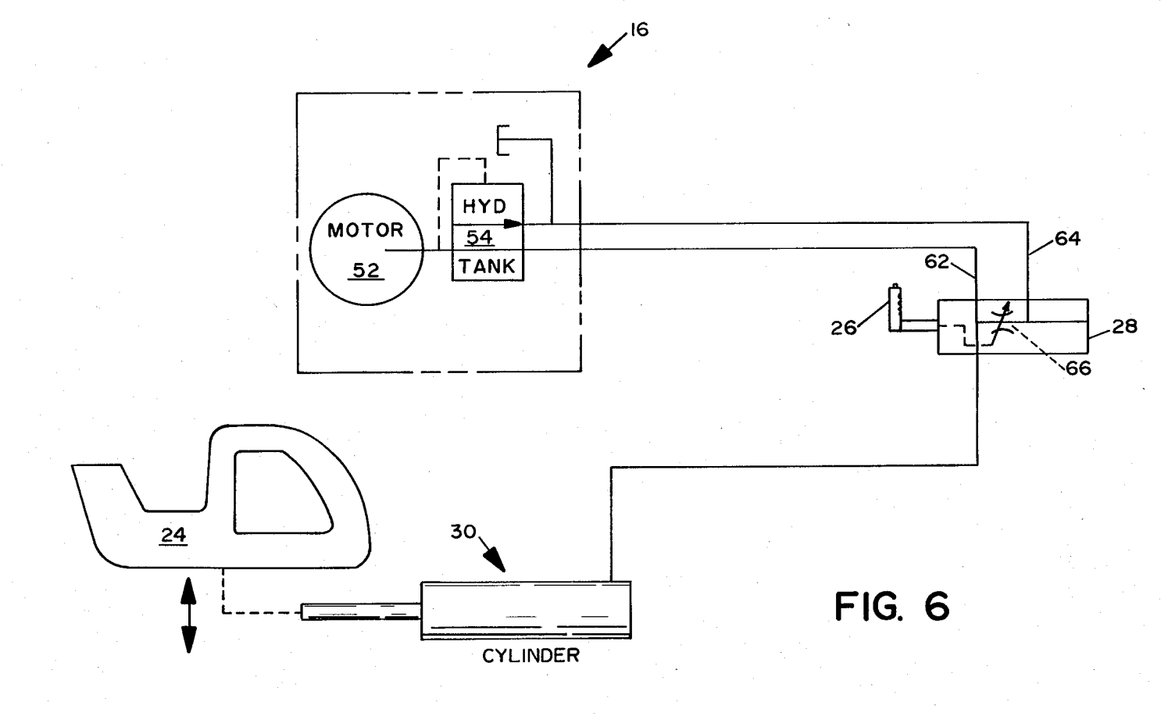
FIG. 6 illustrates a schematic diagram of the hydraulic circuit.

FIG. 6 illustrates a schematic diagram of the hydraulic circuit. All numerals correspond to those elements previously described. The flow is dependent upon the spool cross-section, the spool being illustrated in FIG. 4 for the valve of FIG. 3.

Figure 7:
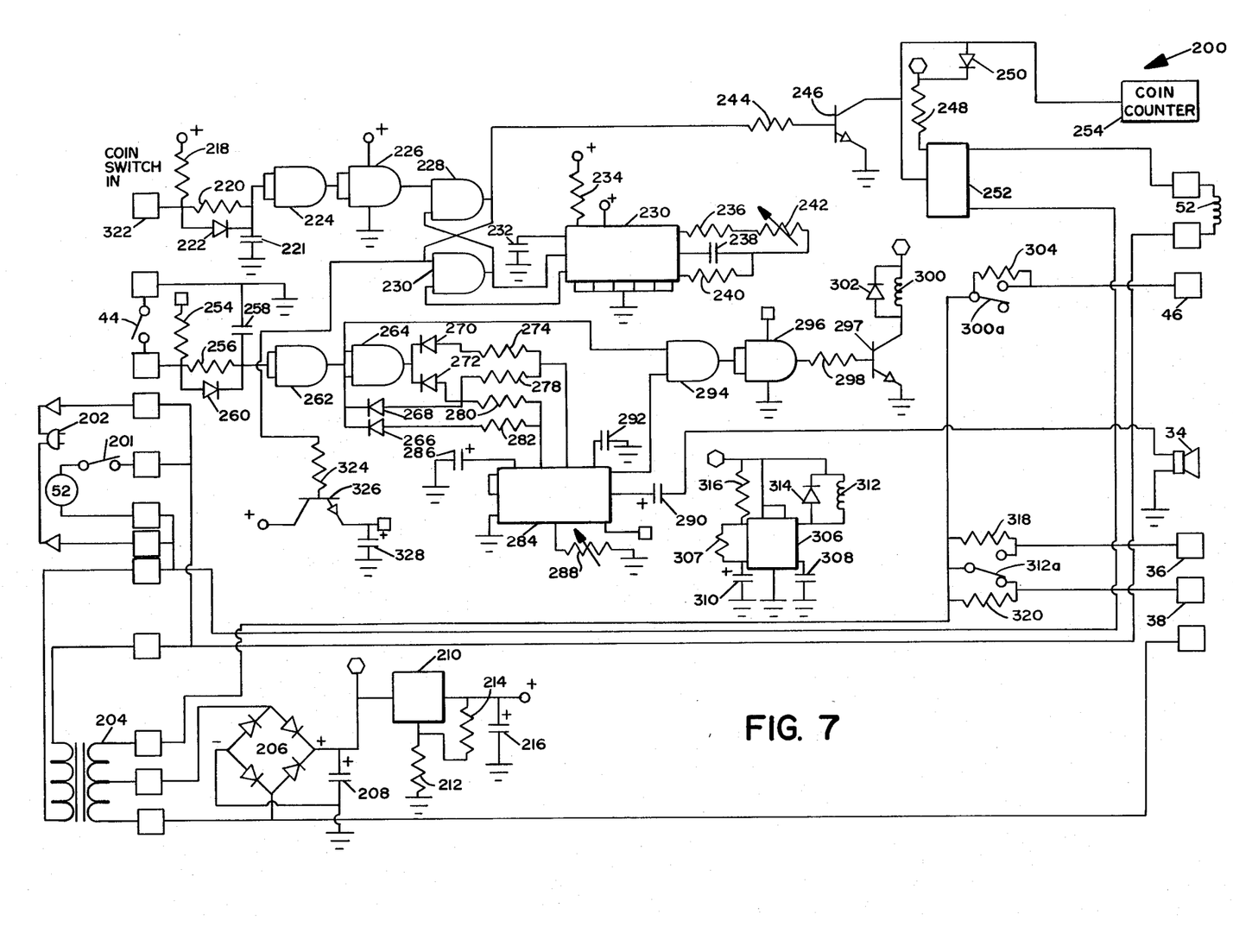
FIG. 7 illustrates an electrical circuit schematic circuit for the aircraft; and, FIG. 8 illustrates a side view of the structure illustrating the aircraft in a raised position.

FIG. 7 illustrates an electrical circuit schematic diagram of the electromechanical and electronic control of the helicopter 10. The electrical circuit 200 controls the motor relay 52, provides audio output through the speaker 34, and flashes the lights 36 and 38 alternately in addition to the gun light 46. Inputs on the righthand side of the circuit diagram include the coin switch 322, the weaponry firing switch 44, and AC power at 202. The power supply includes components 204–216 for providing power through a full-wave bridge rectified voltage regulator power supply. Once a coin is deposited through the coin switch 322, the timing of the helicopter ride is determined by components 218–252 where inverters include components 218–226, flip-flop 228–230, oscillator timer 232–242 where the time is set by potentiometer 242, and a driver which turns on the motor relay through components 244–252. The rotor noise of the helicopter and the phaser weaponry is produced by components 254–304. The gun switch 44 actuates the phaser weaponry firing. Components 324–328 in turn on the noise with the rotor and phasor noise produced by integrated circuit 284 including components 286–290. Components 254–282 switch over the rotor noise generator circuit to the rotor phasor noise generator circuit when the two are combined, and components 294–300 provide the light flashing circuitry for the front weaponry lights 46. Components 306–316 provide the alternating flashing of the lamps 36 and 38 for simulated flight lights.

MODE OF OPERATION

Figure 8:
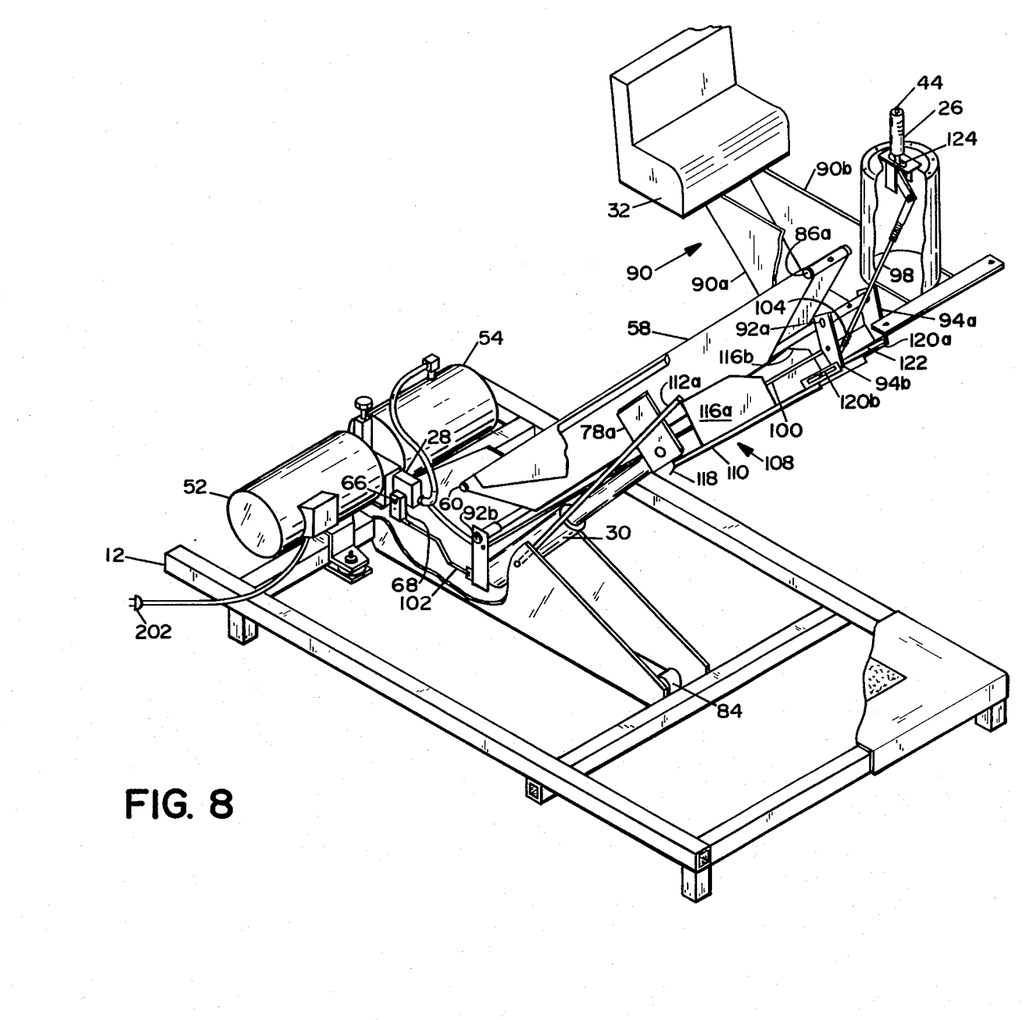

FIG. 8 illustrates operation of the helicopter 10. In operation, the helicopter 10 is plugged into electric power through wall plug 202. The individual then climbs into the helicopter body 24 and positions himself on the seat 32 with his head substantially aligned adjacent to the speaker 34 in preparation for flight. A coin is deposited in the coin switch box 322 for activating the hydraulic motor assembly 16 including the motor 52. Once the motor has started, the joy stick is in an activated position for simulated flight of pulling it back for upward lift and pushing it forward for downward lift from a normal position. The electronic noise generator through the components 254–288 provides rotor noise through speaker 34 while lamps 36 and 38 alternately flash. When the gun switch 44 is actuated, additional weaponry firing noise is added to the rotor noise and the weaponry firing lights 46 flash on and off as illustrated in FIG. 1.

When the joy stick is pulled back, linkages 98, 100, and 102 through link 68 rotate the spool 66 in the valve 28 thereby providing hydraulic fluid to the cylinder 30 forcing the piston outwardly and raising the lift arm assembly 58 about the pivot point 60. This raising continues until the joy stick, is returned to a normal position or one of the stop limits is reached, which will later be described in detail.

FIG. 8 illustrates a side plan view of the lift arm assembly 58 fully raised by the cylinder 30. It is actuated by the joy stick 26. The lift arm will rise to the absolute height based on the inherent structural design but is limited by stop pin 70, so as not to drain the hydraulic oil from the tank 54.

The helicopter 10 has a number of inherent stop limits. The first stop limit is the joy stick slotted member 124. This limits movement of the joy stick. The second stop limit is pin 70 in the valve 28, limiting movement of the valve control link 68. The third stop limit is the inherent limit of the fourbar linkage as to inherently limit movement through the movement of the pivot points of the fourbar linkage. The fourth stop movement is the inherent limit of how far an individual can pull the joy stick backward which is also considered as an inherent mechanical joy stick stop limit. The safety bar 108 also provides an override throttle fifth limit and helps to maintain oil in the cylinder of the hydraulic assembly. The slots 120a and 120b provide limited movement for the pin 122 which also provides an inherent sixth stop limit. The safety features are particularly important with respect to the safety bar assembly in that an individual or object if under the safety bar about the lower portion of the lift arm prohibits movement of the lift arm 58 by overriding the joy stick 26 through the bellbar crank 94a and 94b.

The spool provides for downward movement after upward movement in that a large area is provided for downward lift while a small area of the spool is provided for an upward lift, the spool being illustrated in FIG. 4. Reference is made to narrow area 74 with respect to wide area 72 which controls upward movement and downward movement respectively Various modifications can be made to the present invention without departing from the apparent scope thereof.

Having thus described the invention, what is claimed is:

1. An amusement aircraft simulator comprising:
   a. frame support means including a raisable fourbar linkage having one end rotatably mounted about a shaft secured on said frome and an aircraft body supported on an other end of said linkage;
   b. hydraulic means including a motor-driven hydraulic pump, a reservoir, a geometrically configured valve means connected thereto connected in a hydraulic circuit, and a hydraulic cylinder connected between said frame and a midpoint of said fourbar linkage;
   c. electronic control means for controlling said hydraulic means and supported on said frame;
   d. stop pin means for limiting the distance of travel of said fourbar linkage; and connected to said valve means;
   e. safety bar means over a portion of said fourbar linkage, said safety bar means including pivoting structure connected at a rearward end to said fourbar linkage and having slotted key means at an other end, a first barbell crank connected to a forward end of said fourbar linkage and said slotted key means, and a joy stick linkage connected on opposing sides of said first barbell crank, and a second barbell crank connected to a rearward end of said fourbar linkage;
   f. joy stick means positioned at said other end if said fourbar linkage and including linkage means connected to said valve means; and,
   g. said aricraft body mounted to said other end of said fourbar linkage housing said joy stick means therein, whereby manual actuation of said joy stick means actuates said hydraulic means to further actuate said fourbar linkage to move said aircraft body to simulate free flight.

2. A simulator of claim 1 wherein said slotted key means provides a stop limit for safety of flight.

3. A simulator of claim 1 wherein said valve means includes a round spool having a plurality of wide and narrow orifices.

4. A simulator of claim 3 wherein said wide and narrow orifices are respectively for a fast downward and a slow upward movement of the aircraft body.

5. A simulator of claim 1 wherein said joy stick linkage includes adjustable means at both ends.

6. A simulator of claim 1 wherein said electronic control means includes means for generating sounds of flight, means for generating sounds of weapon firing, means for flashing flight lights, means for flashing weaponry lights, and speaker means for outputting said generated sounds in said aircraft body.

7. A simulator of claim 1 wherein said aircraft is a helicopter.

8. Aircraft of claim 1 including triangular side cover means rotatable about said linkage means for protecting said linkage means from insertion of any object therein.

* * * * *